United States Patent [19]

Yoneda et al.

[11] Patent Number: 5,677,744
[45] Date of Patent: Oct. 14, 1997

[54] REFLECTION TYPE INPUT/OUTPUT LIQUID CRYSTAL DISPLAY

[75] Inventors: Hiroshi Yoneda; Hiroshi Tsujioka; Takao Tagawa, all of Nara-ken, Japan

[73] Assignee: Sharp Kabushiki Kaisha, Osaka, Japan

[21] Appl. No.: 234,000

[22] Filed: Apr. 28, 1994

[30] Foreign Application Priority Data

May 6, 1993 [JP] Japan ..................... 5-105743

[51] Int. Cl.$^6$ ..................... G02F 1/133; G09G 3/36
[52] U.S. Cl. ..................... 349/12; 349/48; 349/143; 349/162; 345/104
[58] Field of Search ..................... 359/54, 58, 59, 359/70, 85; 345/182, 104, 173, 174, 179; 178/18, 19, 20; 349/12, 42, 48, 139, 143, 162

[56] References Cited

U.S. PATENT DOCUMENTS

| | | | |
|---|---|---|---|
| 4,643,530 | 2/1987 | Yamazaki | 359/70 |
| 5,194,852 | 3/1993 | More et al. | 345/182 |
| 5,204,765 | 4/1993 | Mitsui et al. | 349/113 |
| 5,534,892 | 7/1996 | Tagawa | 345/104 |

FOREIGN PATENT DOCUMENTS

| | | |
|---|---|---|
| 0416176 A1 | 3/1991 | European Pat. Off. |
| 56-161521 | 12/1981 | Japan. |
| 59-129892 | 7/1984 | Japan. |
| 59-119320 | 7/1984 | Japan. |
| 3-50621 | 5/1991 | Japan. |

*Primary Examiner*—William L. Sikes
*Assistant Examiner*—Tai V. Duong
*Attorney, Agent, or Firm*—Nixon & Vanderhye P.C.

[57] ABSTRACT

The display apparatus of the invention includes: a first substrate and a second substrate which are disposed so as to face each other; a display medium having variable optical characteristics sandwiched between the first substrate and the second substrate; a display circuit provided on the first substrate; and a coordinate input section for inputting coordinates of a point on the first substrate. The coordinate input section includes: a plurality of coordinate input electrodes arranged in a matrix on the first substrate; signal lines, formed on the first substrate, for supplying coordinate determination signals to the coordinate input electrodes, respectively; active elements for electrically connecting the coordinate input electrodes to the signal lines, respectively; a coordinate designating member for, when the coordinate designating member is brought near the first substrate, forming an electrostatic capacitance with at least one of the coordinate input electrodes; and a coordinate determination circuit for receiving the coordinate determination signal from the coordinate input electrode, and for determining the coordinates of a point to which the coordinate designating member comes closer, based on the received coordinate determination signal.

8 Claims, 12 Drawing Sheets

Output signal for determining coordinates

Input signal for determining coordinates

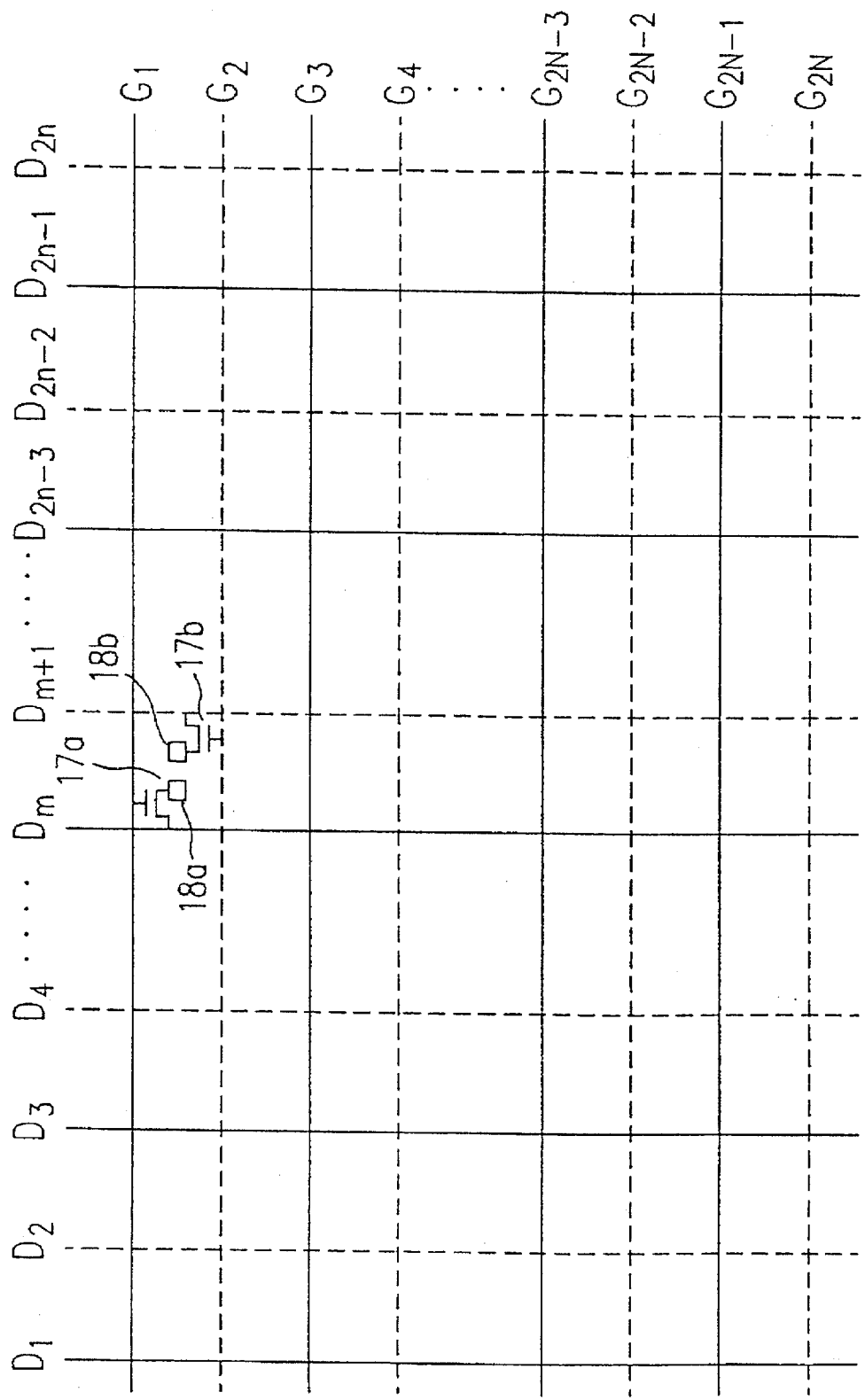

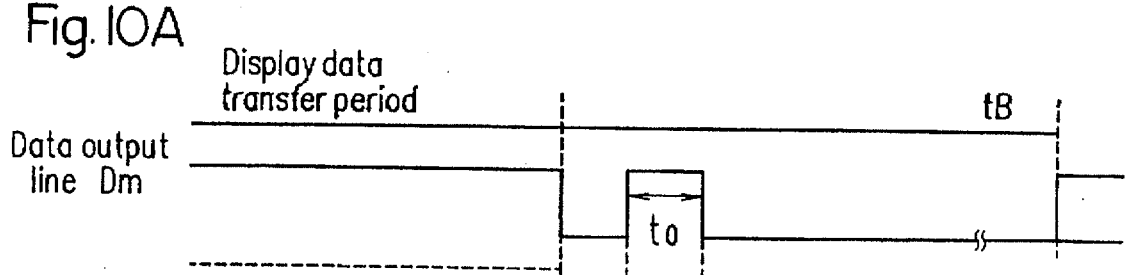
Fig. 10A Data output line Dm
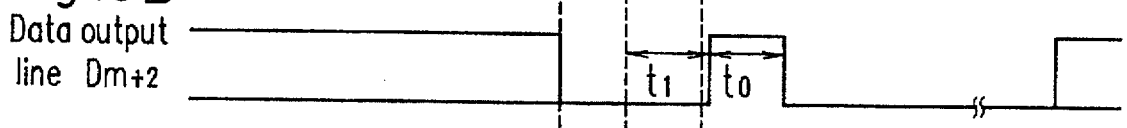
Fig. 10B Data output line Dm+2
Fig. 10C Gate potential (1) of data output transistor (GM line)
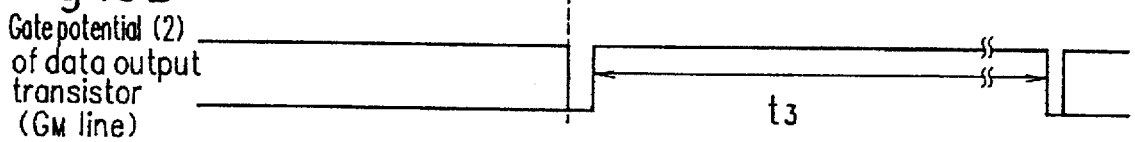
Fig. 10D Gate potential (2) of data output transistor (GM line)
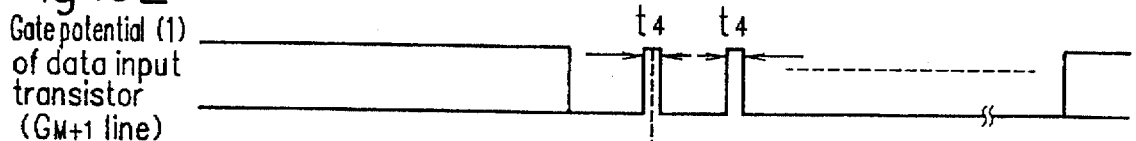
Fig. 10E Gate potential (1) of data input transistor (GM+1 line)
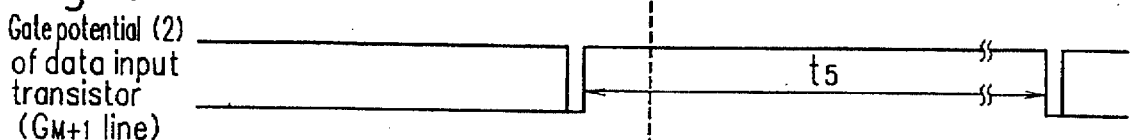
Fig. 10F Gate potential (2) of data input transistor (GM+1 line)
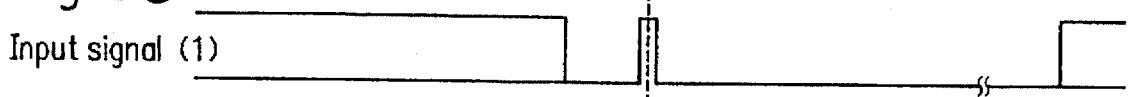
Fig. 10G Input signal (1)
Fig. 10H Input signal (2)

REFLECTION TYPE INPUT/OUTPUT LIQUID CRYSTAL DISPLAY

BACKGROUND OF THE INVENTION

1. Field of the Invention

The present invention relates to a liquid crystal display. More particularly, the present invention relates to a liquid crystal display by which information input/output is performed on a display screen. A so-called "input operation with a pen" is representative of one such information input/output operation onto a display screen.

2. Description of the Related Art

When information is input into a liquid crystal display by using a display screen thereof, and the input information is to be displayed, it is necessary to detect the coordinates of the desired position on the display screen. In recent year, various devices have been proposed and practically used as devices capable of detecting coordinates on a display screen. Such devices include the following:

(1) An information input/output device (Japanese Laid-Open Patent Publication No. 59-119320) in which a transparent film with transparent X electrodes and Y electrodes arranged in a matrix is disposed on a screen of a display, and the desired position is pressed with a finger or a pen so as to bring the X electrode into contact with the Y electrode, thereby detecting the coordinate of the pressed position.

(2) An information input/output device (Japanese Laid-Open Patent Publication No. 59-129893) in which desired coordinates are designated by light.

(3) An information input/output device in which coordinates are detected by a method using electromagnetic induction.

(4) An information input/output device (Japanese Laid-Open Patent Publication No. 56-161521) in which coordinates are detected by a method using electrostatic coupling.

Presently, a portable information input/output device is increasingly desired. The device of (4) above which utilizes an electrostatic coupling is most suitably produced as a portable device. A suitable device for a portable information input/output device should satisfy such requirements as low power consumption, high luminance, and high definition.

In the device of (1) above, the film disposed on the display screen is not completely transparent, i.e., opaque, which causes the luminance to be reduced. In the devices of (2) and (3) above, the coordinate detection is performed by light or electromagnetic induction, which causes the power consumption to be increased. Thus, the devices (1), (2), and (3) are not suitable for a portable device.

For a liquid crystal display which is one type of display, the liquid crystal driving method is gradually developed from a static driving method applied to segment driving to a simple matrix driving method, and to an active matrix driving method as the display capacity is increased, as the definition is improved, and as the number of gray scales is increased.

FIG. 17 shows the construction of a liquid crystal display by which desired coordinates on a display screen can be input with a pen. On one face of a substrate 100, strip-shaped scanning signal electrodes (X electrodes) 101 are disposed. On another face of a substrate 102, strip-shaped data signal electrodes (Y electrodes) 103 are disposed. The substrates 100 and 102 are attached to each other in such a manner that the X electrodes cross the Y electrodes and the faces of the substrates 100 and 102 on which the X and Y electrodes are formed face inside. A liquid crystal layer 104 is interposed between the substrates 100 and 102.

In such a device, for example, a period in which data for display is transferred (hereinafter, simply referred to as a display period), an X-coordinates detection period, and a Y-coordinate detection period constitute one cycle for display. In the X-coordinate detection period, signals having pulse waveforms for coordinate detection are sequentially output to the X electrodes 101. When a point on a display screen is designated with a pen for coordinate detection (not shown), a signal which is output to the X electrode 101 closest to the designated point is transmitted to the pen via electrostatic coupling formed between the pen and the X electrode 101. The coordinate detection pen is electrically connected to a coordinate detection circuit (not shown) through a wiring or the like. The signal transmitted from the X electrode 101 is input into the coordinate detection circuit. In the coordinate detection circuit, the signal from the coordinate detection pen is compared with the signals having pulse waveforms output to the X electrodes 101, so that the X-coordinate of the point designated with the pen is obtained. Similarly, in the Y-coordinate detection period, the Y-coordinate is obtained based on the signal having a pulse waveform sequentially output to the Y electrodes 103 and the signal input from the coordinate detection pen. In this way, the coordinate of any desired point on the display screen can be input by designating the point with the pen.

The device shown in FIG. 17 is an exemplary liquid crystal display of a simple matrix type by which the coordinate of a point on a display screen can be input with a pen. In order to enhance the image quality of the display screen, it is preferred to use an active matrix type liquid crystal display. In general, in the active matrix type liquid crystal display, on an inner face of one of two substrate sandwiching a liquid crystal layer, a plurality of scanning signal lines and data signal lines are formed, and active elements are provided in the vicinity of the crossings of the signal lines. In addition, pixel electrodes are provided so as to be connected to the active elements which are connected to both of the signal lines. As an active element, a thin film transistor or the like is typically used. On an inner face of the other of the two substrates sandwiching the liquid crystal layer, a transparent electrode having a common potential, i.e., a counter electrode is provided substantially over the entire face. In such a liquid crystal display, the coordinate input operation with a pen is performed by a method utilizing electrostatic coupling, for example, described in Japanese Laid-Open Patent Publication No. 3-50621.

FIG. 18 shows the construction of a reflection-type liquid crystal display of active matrix type in which an amorphous silicon TFT (hereinafter, referred to as an a-Si TFT) is used as an active element. A counter substrate 107 is attached to a TFT substrate 109 so that the substrate face each other with a liquid crystal layer 105 interposed therebetween. On the TFT substrate 100, a layer 108 including scanning signal lines, data signal lines, a-Si TFTs as active elements, and pixel electrodes is provided. On the counter substrate 107, a counter electrode 106 is formed substantially over the entire face of the substrate. In addition, on the other face of the TFT substrate 109 which is not in contact with the liquid crystal layer 105, a reflection plate 110 is disposed. Although not shown in FIG. 18, a polarizing plate may be provided, as required.

The liquid crystal panel including the liquid crystal layer 105, and the counter substrate 107 and the TFT substrate 109 which face each other with the liquid crystal layer 105 interposed therebetween is located on a body of the liquid crystal display so that the counter substrate 107 is positioned on the front side. This is because the opening ratio in the reflection-type liquid crystal display of active matrix type is more significant than in a transmission-type liquid crystal display, so that the active element such as a TFT cannot be simply provided on the front side. Thus, in the reflection-type liquid crystal display of the active matrix type, the counter electrode 106 positioned on the front side serves as a shield. Therefore, it is impossible to input the coordinates by using the electrostatic coupling, as described in the above-identified publication.

SUMMARY OF THE INVENTION

The display apparatus of the invention includes: a first substrate and a second substrate which are disposed to face each other; a display medium sandwiched between the first substrate and the second substrate, the display medium having variable optical characteristics; a display circuit provided on the first substrate; and coordinate input means for inputting coordinates of a point on the first substrate. The coordinate input means includes: a plurality of coordinate input electrodes arranged in a matrix on the first substrate; first signal lines for supplying coordinate determination signals to the coordinate input electrodes, respectively, the first signal lines being formed on the first substrate; first active elements for electrically connecting the plurality of coordinate input electrodes to the first signal lines, respectively; a coordinate designating member for, when the coordinate designating member is brought near the first substrate, forming an electrostatic capacitance with at least one of the plurality of coordinate input electrodes; and coordinate determination means for receiving the coordinate determination signal from the at least one of the plurality of coordinate input electrode, and for determining the coordinates of a point to which the coordinate designating member comes closer, based on the received coordinate determination signal.

In one embodiment of the invention, the display apparatus further includes reflection means for reflecting light which has passed through the display medium, the reflection means being provided adjacent to the second substrate.

In another embodiment of the invention, the display circuit includes: pixel electrodes; second signal lines for applying driving signals to the pixel electrodes, the driving signals causing the optical characteristics of the display medium to be varied; and second active elements for electrically connecting the second signal lines to the pixel electrodes in accordance with a control signal.

In another embodiment of the invention, each of the first active elements and the second active elements has a carrier mobility of 5 $cm^2V.s$ or more.

In another embodiment of the invention, the coordinate input means further includes third signal lines provided on the first substrate, the third signal lines crossing the first signal lines at right angles, the third signal lines transmitting signals for controlling ON/OFF states of the first active elements, wherein the first active elements are thin film transistors.

In another embodiment of the invention, the display circuit further includes: fourth signal lines provided on the first substrate, the fourth signal lines crossing the second signal lines at right angles, the fourth signal lines transmitting the control signals; and a counter electrode provided on the second substrate. In such a display apparatus, the second active elements are thins film transistors connected to the second signal lines and the fourth signal lines, and the optical characteristics of the display medium are varied depending on a potential differences between the counter electrode and the pixel electrodes.

In another embodiment of the invention, the reflection means is formed between the second substrate and the display medium, and the reflection means is a reflection electrode which also functions as the counter electrode.

In another embodiment of the invention, the first and second active elements are p-Si TFTs.

In another embodiment of the invention, the phase of the coordinate determination signal is different from the phases of the remaining coordinate determination signals.

According to another aspect of the invention, the display apparatus includes: a first substrate and a second substrate which are disposed to face each other; a display medium sandwiched between the first substrate and the second substrate, the display medium having variable optical characteristics; a display circuit provided on the first substrate; coordinate input means for inputting coordinates of a point on the second substrate, the coordinate input means including: a coordinate input circuit provided on the second substrate; a coordinate designating member for designating the point; and a coordinate determination circuit; and a counter electrode provided on the second substrate. The coordinate input circuit is disposed on the counter electrode opposite to the display medium with respect to the counter electrode.

In one embodiment of the invention, the display apparatus further includes reflection means for reflecting light which has passed through the display medium, the reflection means being disposed on the first substrate opposite to the display medium with respect to the first substrate.

In another embodiment of the invention, the coordinate input circuit includes: a plurality of first signal electrodes provided in parallel to each other on the second substrates; and a plurality of second signal electrodes disposed to cross the plurality of first signal electrodes at right angles, the coordinate designating member forms, when the coordinate designating member is brought near the second substrate, electrostatic capacitance with one of the plurality of first signal electrodes and with one of the plurality of second signal electrodes, the coordinate designating member detects a potential change via the electrostatic capacitances, and generates a coordinate determination input signal depending on the potential change, and the coordinate determination means determines the coordinates of a point to which the coordinate designating member comes closer based on the coordinate determination input signal.

In another embodiment of the invention, the coordinate input circuit includes: a plurality of coordinate input electrodes arranged in a matrix on the second substrate; first signal lines for supplying coordinate determination signals to the coordinate input electrodes, respectively; and first active elements for electrically connecting the plurality of coordinate input electrodes to the first signal lines, respectively, the coordinate designating member forms, when the coordinate designating member is brought near the second substrate, an electrostatic capacitance with at least one of the plurality of coordinate input electrodes, and the coordinate determination means receives the coordinate determination signal from at least one of the plurality of coordinate input electrodes via the electrostatic capacitance, and determines the coordinates of a point to which the coordinate designating member comes closer based on the received coordinate determination signal.

In another embodiment of the invention, the display apparatus further includes a light shielding film formed on the second substrate, wherein the coordinate input circuit is located in an area in which the light shielding film is formed.

In another embodiment of the invention, part of the coordinate input circuit is formed of a material having a light shielding property.

According to another aspect of the invention, the display apparatus includes: a first substrate and a second substrate which are disposed to face each other; a display medium sandwiched between the first substrate and the second substrate, the display medium having variable optical characteristics; reflection means for reflecting light which has passed through the display medium, the reflection means being disposed adjacent to the first substrate; a display circuit provided on the first substrate; coordinate input means for inputting coordinates of a point on the first substrate; and a counter electrode formed on the second substrate. The coordinate input means includes: a plurality of coordinate input electrodes arranged in a matrix on the first substrate; a plurality of first signal lines for supplying coordinate determination signals to the coordinate input electrodes, respectively, the first signal lines being formed on the first substrate; first active elements for electrically connecting the plurality of coordinate input electrodes to the first signal lines, respectively; a coordinate designating member for, when the coordinate designating member is brought near the first substrate, forming an electrostatic capacitance with at least one of the plurality of coordinate input electrodes; and coordinate determination means for receiving the coordinate determination signal from the at least one of the plurality of coordinate input electrodes, and for determining the coordinates of a point to which the coordinate designating member comes closer based on the received coordinate determination signal. In such a display apparatus, the counter electrode is a transparent conductive film having apertures provided at positions corresponding to the plurality of coordinate input electrodes.

Thus, the invention described herein makes possible the advantage of providing a liquid crystal display by which the coordinates can be input by utilizing the electrostatic coupling, and which can attain high luminance and low power consumption.

This and other advantages of the present invention will become apparent to those skilled in the art upon reading and understanding the following detailed description with reference to the accompanying figures.

BRIEF DESCRIPTION OF THE DRAWINGS

FIG. 9 is an equivalent circuit diagram of the information input/output circuit of the case shown in FIG. 8.

FIGS. 10(a)–10h) show exemplary waveforms when the coordinates are determined.

DESCRIPTION OF THE PREFERRED EMBODIMENTS

Hereinafter, the present invention will be described by way of illustrative examples with reference to the accompanying drawings.

Figure 1A:
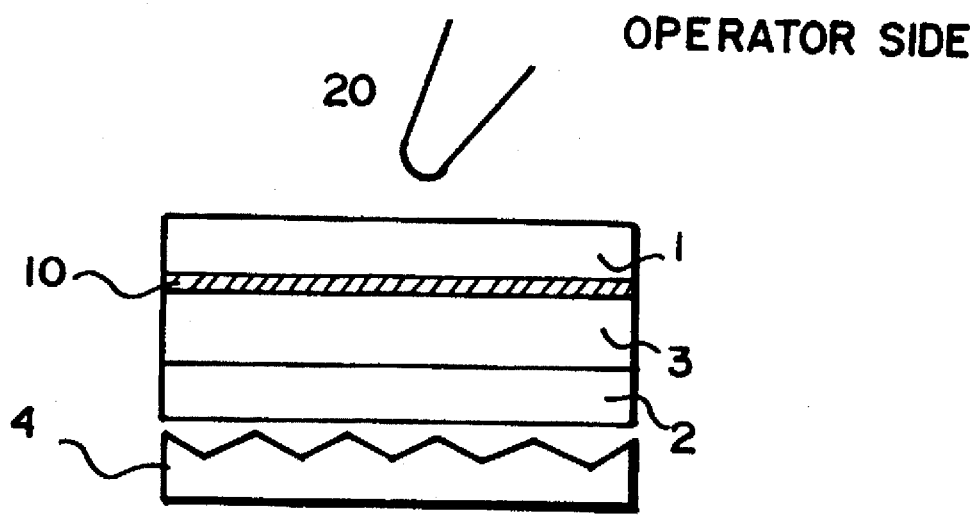
FIG. 1A is a cross-sectional view of a liquid crystal display in one example according to the invention.

FIG. 1A is a cross-sectional view of a liquid crystal display in one example. The liquid crystal display includes two substrates 1 and 2 which face each other with a liquid crystal layer 3 interposed therebetween. The substrate 1 is disposed on the front side, i.e., on the operator side, and the substrate 2 is disposed on the back side. On the face of the substrate 1 which is in contact with the liquid crystal layer 3, a layer 10 including a display circuit and an information input/output circuit is formed. On the face of the substrate 2 opposite the face thereof which is in contact with the liquid crystal layer 3, a reflection plate 4 is provided.

Figure 2:
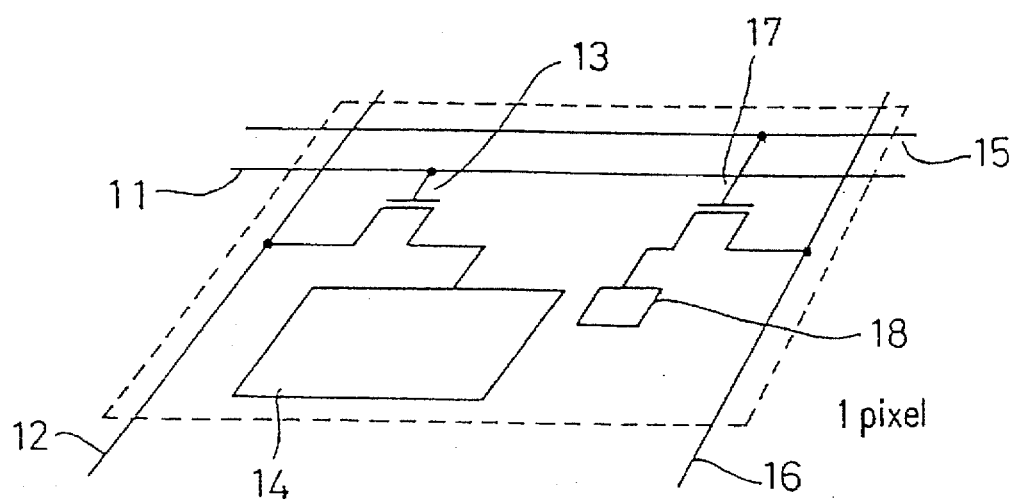
FIG. 2 is a diagram showing an information input/output circuit formed in the liquid crystal display shown in FIG. 1A.

FIG. 2 shows the display circuit and the information input/output circuit included in the layer 10. The display circuit and the information input/output circuit shown in FIG. 2 correspond to one pixel. The display circuit includes scanning signal lines 11 and data signal lines 12 which cross each other at right angles, active elements 13 provided in the vicinity of the respective crossings of the signal lines 11 and 12 and connected to both of the signal lines 11 and 12, and pixel electrodes 14 connected to the active elements 13. The information input/output circuit also includes data control signal lines 15 and data output signal lines 16 which cross each other at right angles, active elements 17 provided in the vicinity of respective crossings of the signal lines 15 and 16 and connected to both of the signal lines 15 and 16, and electrodes 18 connected to the active elements 17. In FIG. 2, thin film transistors (hereinafter, referred to as TFTs) are used as the active elements. The scanning signal lines 11 and the data signal lines 12 in the display circuit are disposed in parallel to the data control signal lines 15 and the data output signal lines 16, respectively. Each pixel electrode 14 is formed in an area surrounded by a signal line 11 connected to the pixel electrode 14 and a signal lines 11 adjacent to the signal lines 11 via the pixel electrode 14, and a signal line 12 connected to the pixel electrode 14 and a signal lines 12 adjacent to the signal line 12 via the pixel electrode 14. Each electrode 18 is formed in an area surrounded by a signal line 15 connected to the electrode 18 and a signal line 15 adjacent to the signal line 15 via the electrode 18, and a signal line 16 connected to the electrode 18 and a signal line 16 adjacent to the signal line 16 via the electrode 18.

Next, an exemplary method for producing such a liquid crystal display will be described with reference to FIG. 1A.

First, on a glass substrate 1, an insulating film which can prevent $Na^+$ in the glass substrate 1 from entering a semiconductor layer of an active element or a liquid crystal layer is formed by a known method such as plasma enhanced chemical vapor deposition (PECVD). As the insulating film, an $SiO_2$ film or an $SiN_x$ film is used. Next, at each of positions on the insulating film at which TFTs 13 and 17 are to be formed, an amorphous silicon intrinsic semiconductor layer (an 1 layer) is formed by low pressure CVD (LPCVD) or PECVD. The 1 layer is crystallized so as to obtain a polycrystalline silicon layer. After a gate insulating film is formed on the polysilicon layer, a metal film is formed on the entire top face of the glass substrate 1. The material of the metal film is selected from the group consisting of Al, Nb, Ta, Mo, Cr, Ti, Al—Si, and the like, and alloys thereof. The formation of the metal film is conducted by sputtering, deposition, or other methods. The thus formed metal film is patterned into a desired shape, so as to form gate electrodes of the TFTs 13 and 17. In the above steps, scanning signal lines 11 or data control signal lines 15 can be also formed. Next, the semiconductor layer is doped with P-type ions or N-type ions by using the gate electrodes as a mask, so as to form source regions and drain regions of the TFTs 13 and 17 in self-alignment. Thereafter, an interlevel insulating film of, for example, $SiO_2$ or $SiN_x$ is formed on the entire face of the substrate 1. Contact holes are formed through the interlevel insulating film, and source electrodes and drain electrodes of the TFTs 13 and 17 are formed on the interlevel insulating film. The material of the source and drain electrodes can be selected from the group consisting of Al, Nb, Ta, Mo, Cr, Ti, Al—Si, and the like, and alloys thereof. In the above steps, data signal lines 12 or data output signal lines 16 can be also formed. Next, pixel electrodes 14 and electrodes 18 are formed so as to be electrically connected to the drain electrodes of the TFTs 13 and 17. In the final step, a transparent protective film is formed on the entire face of the substrate 1. However, it is preferred to finally remove portions of the transparent protective film on the pixel electrodes 14 and the electrodes 18. As the protective film, a film capable of transmitting light such as an $SiN_x$ film, a boro-phospho-silicate glass (BPSG) film, a phospho-silicate glass (PSO) film, an $SiO_2$ film or the like can be used.

On a substrate 2 which is disposed on the back side, a counter electrode (not shown) formed of a transparent conductive film such as an ITO is formed over substantially the entire face of the substrate 3. As substrate 2, an insulating transparent substrate such as a glass substrate is used, the same as in substrate 1. After the counter electrode is formed, the substrate 2 and the substrate 1 having a layer 10 are attached to each other. At this time, the substrates 1 and 2 are attached so that the layer 10 and the counter electrode face each other. After the substrates 1 and 2 are attached to face each other, liquid crystal is charged between the substrates 1 and 2, so as to form a liquid crystal layer 3. In the final step, a reflection plate 4 is provided on a face of the substrate 2 opposite to the face thereof which is in contact with the liquid crystal layer 3. If necessary, it is possible to form alignment films so as to be in contact with the liquid crystal layer, on the protective film of the substrate 1 and on the counter electrode of the substrate 2.

An example of a coordinate input operation in the thus produced liquid crystal display will be described below with reference to FIG. 3.

In the state where all of the data control signal lines 15 are active, signals having different phases are sequentially applied to the data output signal lines 16 as the coordinate determination output signals. The output signals are applied to the electrodes 18 through the ON-state TFTs 17. In the coordinate input operation, in order to input the coordinates of a desired point on the display screen, an operator designates the desired point with a pen for coordinate input (hereinafter simply referred to as a pen) 20. The substrate 1 is disposed on the operator side as described above, so that when the point is designated, the pen 20 is brought near and into contact with the substrate 1. When the pen 20 comes in contract with an area in which the electrodes 18 are provided on the substrate 1, an electrostatic capacitance is generated between the pen 20 and the electrode 18. As a result, the pen 20 is electrically connected (capacitance-coupled) to the electrode 18, and the coordinate determination output signal output to one of the electrodes 18 is input to the pen 20. The pen 20 is electrically connected to a coordinate determination processing circuit (not shown) via, for example, a signal cable. The signal input from the electrode 18 to the pen 20 is applied to the coordinate determination processing circuit as a coordinate determination input signal. The coordinate determination processing circuit compares the phase of the received input signal with the phase of the signals output to the data output signal lines 16. The coordinate determination processing circuit determines the X coordinate of the point designated with the pen 20, based on the compared result. The determination of the Y-coordinate is performed in the same way as in the determination of the X-coordinate except for the following. In the determination of the Y-coordinate, in the state where all of the data output signal lines 16 are active, signals having different phases are sequentially output to the data control signal lines 15. In the coordinate input operation, either the determination of the X-coordinate or the determination of the Y-coordinate can be first performed.

Alternatively, the X-coordinate and the Y-coordinate can be simultaneously detected. First, one data control signal line or a group of data control signal lines are sequentially made active. The number of signal lines which are simultaneously made active is determined depending on the required resolution. When the data control signal lines are in the active state, signals having pulse waveforms with different phases are sequentially output to the data output signal lines. In the case where the signal lines of the display circuit are also used as at least one of the data control signal lines and the data output signal lines, the display signals may also be used as the coordinate determination signals, which is described below. For example, in the case where the data control signal lines also function as the scanning signal lines of the display circuit, the data control signal lines can be made active using the display scanning signals.

In the above-mentioned layer 10, as the TFTs 13 and 17, a TFT having a carrier mobility of 5 $cm^2/V.s$ or more such as a polycrystalline silicon TFT (hereinafter simply referred to as a p-Si TFT) is used. Instead of such a TFT, another type of active element having a carrier mobility of 5 cm²/V.s or more such as an MIM element can also be used.

Concerning the case where a-Si TFTs are used for the TFTs 13 and 17 as in the above construction, the same as in the conventional active matrix type liquid crystal display. Since the a-Si TFT has a carrier mobility of about 0.5 cm²/V.s, there is a limit to the minimization of the size of the a-Si TFT. This causes the opening ratio to be significantly reduced. However, in this example as described above, a TFT having a mobility which is ten times or more higher than that of the a-Si TFT is used, so that the size of each of the TFTs 13 and 17 can be minimized. Accordingly, it becomes possible to dispose the substrate 1 having the TFTs 13 of the display circuit formed thereon on the front side, without significantly reducing the opening ratio, and also it becomes possible to provide the TFTs 17 of the information input/output circuit on the substrate 1.

In more detail, for example, in screens having 4- to 6-inch sizes which are, at the present the mainstay of the screen sizes of middle and small types, a typical pixel size is about 50 μm×50 μm. If one a-Si TFT having an occupied area of about 50 μm×15 μm is provided, for example, for each pixel having such a size, the loss of light only due to the TFT reaches about 30%, i.e., the opening ratio is significantly degraded. However, instead of the a-Si TFT, an active element having a smaller occupied area but having a carrier mobility which is ten times or more higher as compared with the a-Si TFT is provided for each pixel having the above-mentioned size, it is possible to suppress the loss of light only due to the TFT to be about 2 or 3 percent. Therefore, as described in this example, if two active elements for display and for information input/output are provided for each pixel, the opening ratio is not largely reduced. Accordingly, it is possible to provide an information input/output circuit which enables signals to be transmitted to and from the pen, on the substrate 1 which is disposed on the front side.

As an active element having a carrier mobility μ or 5 cm²/V.s or more, in addition to the above-mentioned p-Si TFT, there may be another type of active element such as a transistor formed in a thin film on a substrate made of single crystal silicon, sapphire, diamond, or the like. In the case where an active element formed on a non-transparent single crystal silicon substrate is used as the display active element and the data input/output active element in this example, the active element may be peeled off from the single crystal silicon substrate, and moved to and mounted on a transparent substrate.

In addition, it is possible to use a two-terminal element such as an MIM element, a variator, or the like as the active element having the carrier mobility of 5 cm²/V.s or more. For example, in the case where an MIM element is used as an active element, one of the signal lines 11 and 12 is formed on the substrate 1 which is disposed on the front side. The other is formed on the substrate 2. In general, the signal lines formed on the substrate 2 are made of a plurality of strips of transparent conductive film which are provided perpendicularly to the signal lines formed on the substrate 1 with the liquid crystal layer 3 interposed therebetween. Each strip of transparent conductive film also functions as a counter electrode. Therefore, in this case, it is unnecessary to additionally provide a counter electrode on the substrate 2. Moreover, the reduction of the specific resistance of the signal line used for information input/output can attain the same effects as those attained in the case where an active element having a mobility of 5 cm²/V.s or more is used.

Figure 4:
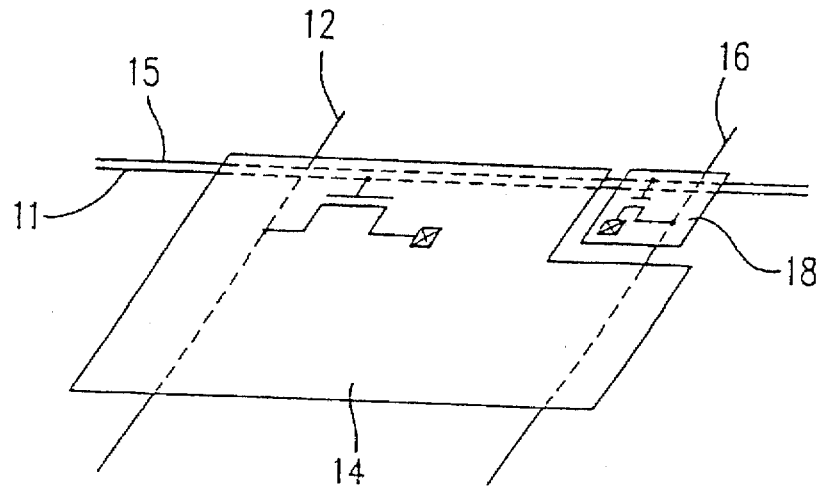
FIG. 4 is a diagram showing another construction of the information input/output circuit formed in the liquid crystal display shown in FIG. 1A.

In the above example, the display circuit and the information input/output circuit are formed as is shown in FIG. 2. Alternatively, it is possible to form them as shown in FIG. 4. In FIG. 4, the pixel electrodes 14 are formed on the scanning signal lines 11 and the data signal lines 12 of the display circuit and on the signal lines 15 and 16 of the information input/output circuit. The electrodes 18 of the information input/output circuit is formed on the scanning signal lines 11 and the signal lines 15 and 16. In this case, the TFTs 13 and the TFTs 17 which are respectively connected to the pixel electrodes 14 and the electrodes 18 are formed under the corresponding electrodes.

Figure 1B:
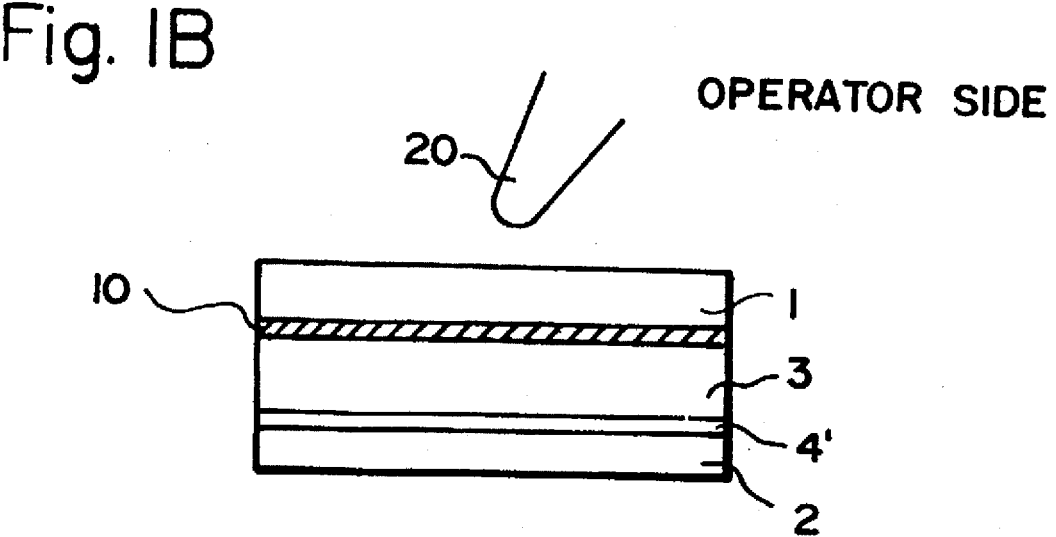
FIG. 1B is a cross-sectional view of a liquid crystal display in one example according to the invention.

It is appreciated that, if the information input/output circuit including the signal lines 15 and 16, the active elements 17, and the electrodes 18 is provided on the face of the substrate 1 which is opposite the face thereof in contact with the liquid crystal layer 3 (i.e., on the upper face of the substrate 1 in FIG. 1A), the same effects as in the above example can be attained. Alternatively, the reflection plate 4' can be disposed on the upper side of the substrate 2 as shown in FIG. 1B. In such a case, the reflection plate 4 is made of Al or the like, and functions not only as a reflector for reflecting the light entering the liquid crystal layer 3 from the substrate 1 side but also as an electrode for applying a voltage to the liquid crystal layer 3. Accordingly, it is possible to omit the formation of the counter electrode of the transparent conductive film.

In the above example, one information input/output circuit is provided for each pixel. However, it is not necessary to provide such information input/output circuits for all of the pixels. For example, only for each of the pixels provided in an area to which the coordinates are input, the active element 17 and the electrode 18 of the information input/output circuit may be provided. Alternatively, independent of the pixels, it is possible to dispose the information input/output circuits at appropriate intervals. In such a case, the interval between respective information input/output circuits is determined considering the required accuracy of the coordinate input and the size of the pen for coordinate input.

In the above example, other optical elements such as a polarizing plate, a color filter, or the like are not provided. If such a optical elements are provided as required, the same effects as those attained by the above example can be attained.

The information input/output circuit can also function as the display circuit. Alternatively, some of the data control signal lines, data input/output signal lines, active elements, and electrodes can also function as the components of the display circuit. Such cases will be described with reference to FIGS. 5 and 6.

Figure 5:
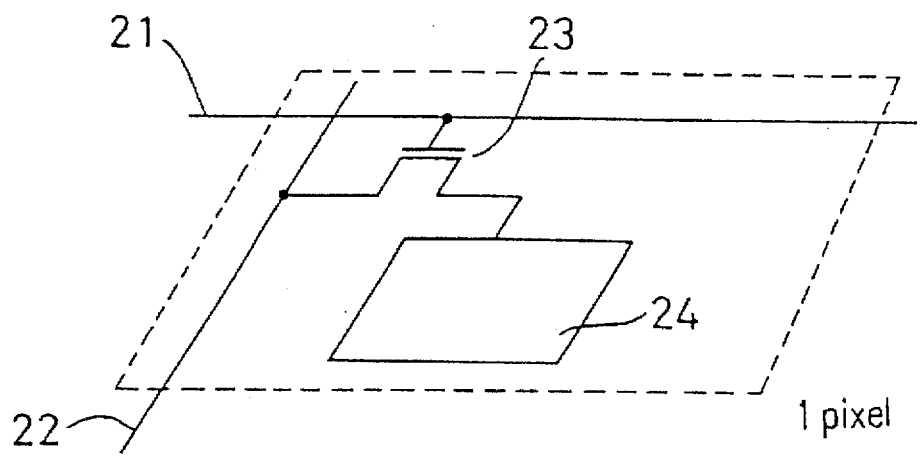
FIG. 5 is a diagram showing another construction of the information input/output circuit formed in the liquid crystal display shown in FIG. 1.

The circuit shown in FIG. 5 is formed in the same process steps which are used for forming a usual display circuit. Herein, as an active element for applying a voltage to a pixel electrode, a p-Si TFT is used. First, a scanning signal line 21 is formed on a substrate 1, and an insulating film is formed so as to cover the scanning signal line 21. In the same step as the formation of the scanning signal line 31, a gate electrode of a p-Si TFT 23 is formed. On the insulating film, a data signal line 22 which crosses the scanning signal line 21 at right angles, and a source electrode and a drain electrode of the p-Si TFT 23 are formed. In the final step, a pixel electrode 24 is formed so as to be in contact with the drain electrode of the p-Si TFT 23. The thus formed scanning signal line 21 is used as the data control signal line of the information input/output circuit, and the data signal line 23 is used as the data input/output signal line. In addition, the p-Si TFT 23 and the pixel electrode 24 also function as the data input/output active element and the electrode of the information input/output circuit.

Figure 6:
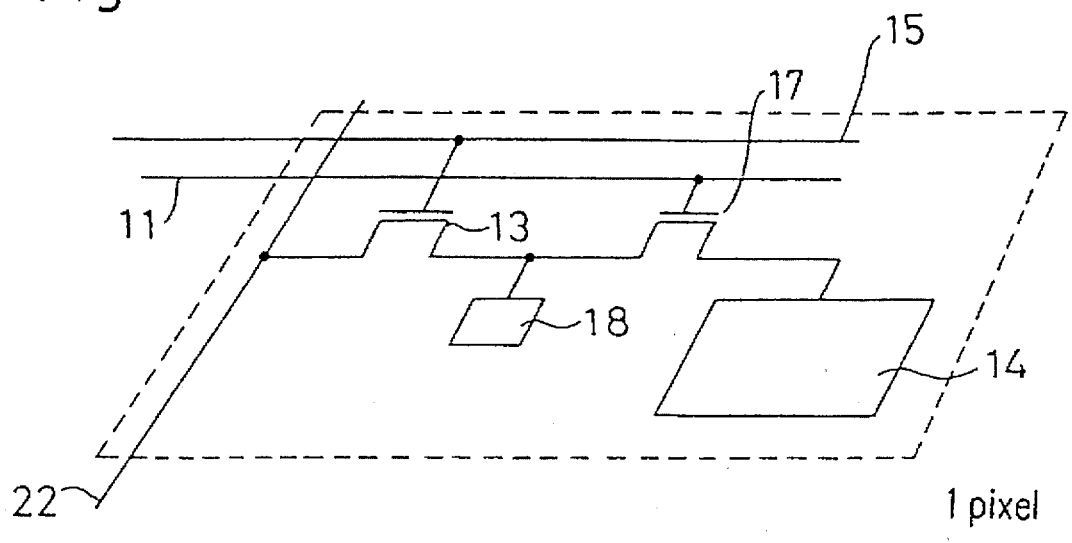
FIG. 6 is a diagram showing another construction of the information input/output circuit formed in the liquid crystal display shown in FIG. 1.

In the circuit shown in FIG. 6, the data control signal line 15 of the information input/output circuit is separately provided from the scanning signal line 11, but the data signal line 22 of the display circuit also function as the data input/output signal line of the information input/output circuit. To the signal line 22, the active element 17 of the information input/output circuit and the active element 13 of the display circuit are connected in series.

As described above, all of or some of the components of the information input/output circuit may function as the components of the display circuit. The connection between the components of the display circuit and the information input/output circuit in such a case can be desirably selected. Also, as is shown in FIG. 6, in the case where some of components of the information input/output circuit function as the components of the display circuit, such information input/output circuits can not be provided for all of the pixels, but only for some of the pixels. Alternatively, it is possible to provide an information input/output circuits at appropriate intervals, independent of the pixels. In such a case, the interval between the respective information input/output circuits, i.e., the interval between the components which do not function as the components of the display circuit is determined considering the required accuracy of coordinate input, and the size of the pen for coordinate input.

Figure 7:
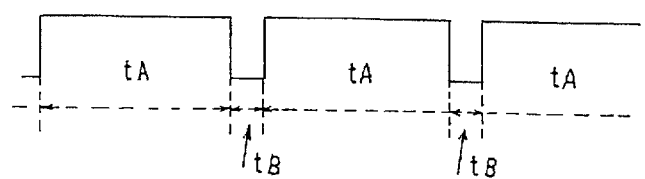
FIG. 7 is a diagram showing insertion timings of the coordinate determination signal.

As is shown in FIGS. 5 and 6, in cases where all of or some of the components of the information input/output circuit are used as the components of the display circuit, the coordinate input operation is performed, for example, between a display operation and the next display operation, in order that the coordinate input operation does not affect the display operations. Specifically, as is shown in FIG. 7, in a blanking interval +B between a display data signal output period +A and the next display data signal output period +A, the coordinate input is performed by outputting the coordinate detection signal to the respective signal lines in the information input/output circuit. If a video signal is used as the display data signal, the coordinate detection signal is inserted in both a horizontal blanking interval and a vertical blanking interval, or in either one of the intervals. In addition, the coordinate input operation is not required to be performed for every completion of the display operation. The coordinate input operation may be performed at any timing in so far as the display operation is not disturbed.

In the circuits shown in FIGS. 2, and 4, 5, and 6, one active element 17 for data input/output and one electrode 18 of the information input/output circuit are provided for each pixel. However, more than one active elements 17 and more than one electrodes 18 may be provided for each pixel. In such an arrangement, it is possible to increase the intensity of the signal to be input into the pen from the electrodes 18 through the electrostatic capacitance C3. Also, in such an arrangement, it is possible to suppress the occurrence of detection errors. If a plurality of active elements 17 and a plurality of electrodes 18 are provided, it is possible to improve the resolution of the coordinate input as compared with the pixel size. In such a case, the arranged interval between the respective active elements 17 and electrodes 18 are determined considering the required resolution and the like.

Figure 3:
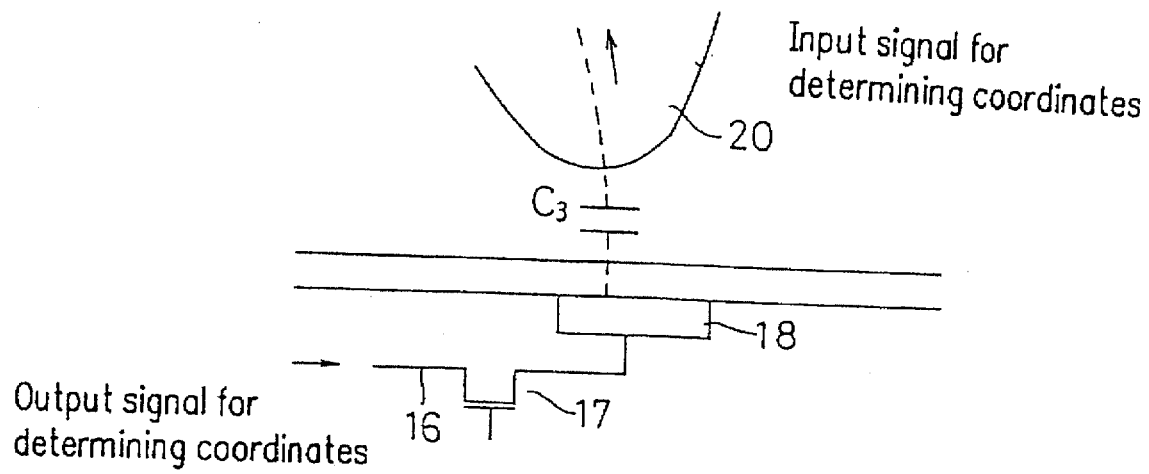
FIG. 3 is a diagram illustrating a method for picking up a coordinate determination signal according to the invention.

In the case of FIG. 3 where only one electrode 18 is used for detecting the coordinates of a point, the signal transmitted to the pen 20 through the electrostatic capacitance C3 is input into the coordinate determination processing circuit via, for example, a signal cable. The coordinate determination processing circuit determines the coordinates based on the signal. Accordingly, it is necessary to electrically connect the pen 20 to the coordinate determination processing circuit by some connection method. In an alternative case, the pen 20 is brought near two electrodes 18a and 18b, so as to generate electrostatic capacitances between the electrode 18a and the pen 20 and between the pen 20 and the electrode 18b. By utilizing the thus generated electrostatic capacitances, the coordinates can be input and detected. In such a case, the pen 20 is not required to be electrically connected to the coordinate determination processing circuit.

Figure 8:
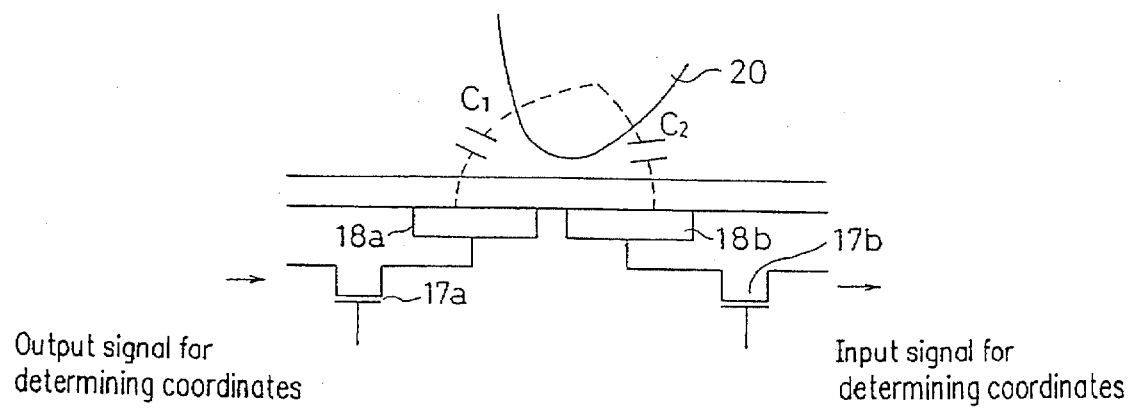
FIG. 8 is a diagram illustrating another method for picking up a coordinate determination signal according to the invention.

Hereinafter, the case when the coordinates are input by bringing the pen 20 near the two electrodes 18a and 18b will be described with reference to FIGS. 8 and 9. When the pen 20 is brought near the two electrodes 18a and 18b, an electrostatic capacitance C1 is generated between the pen 20 and the electrode 18a, and an electrostatic capacitance C2 is generated between the pen 20 and the electrode 18b, as shown in FIG. 8. Accordingly, when the pen 20 is brought near the electrodes 18a and 18b, the electrodes 18a and 18b are electrically connected via the pen 20. In this way, the signal input to the electrode 18a is transmitted to the electrode 18b. Based on the signal transmitted to the electrode 18b, a coordinate determination processing circuit (not shown) determines the coordinates of the point designated with the pen 20.

FIG. 9 is an equivalent circuit diagram of the information input/output circuit in the case where the coordinates are input and detected as is shown in FIG. 8. The signal lines 16 include 2n signal lines $D_1$–$D_{2n}$ (n is a positive integer). The odd-numbered signal lines $D_1$, $D_3$, ... $D_{1n-3}$, and $D_{2n-1}$ (shown by solid lines) are used for data output signal lines. The even-numbered signal lines $D_2$, $D_2$, ... $D_{2n-2}$, and $D_{2n}$ (shown by broken lines) are used for the data input signal lines. To each of the odd-numbered signal lines $D_m$ (m is a positive odd integer), a data output TFT 17a for applying a signal to the electrode 18a is connected. To each of the even-numbered signal lines $D_{m+1}$, a TFT 17b for inputting the signal from the electrode 18b to the signal line $D_{m+1}$ is connected. The data control signal lines 15 also include 2N signal lines $G_1$–$G_{2N}$ (N is a positive integer). The odd-numbered signal lines $G_1$, $G_3$, ... $G_{2N-3}$, and $G_{2N-1}$ (shown by solid lines) are connected to the data output TFTs, so as to transmit signals for controlling the ON/OFF states of the TFTs 17a. Similarly, the even-numbered signal lines $G_2$, $G_4$, ... $G_{2N-2}$, and $G_{2N}$ (shown by broken lines) are connected to the data input TFTs.

In the information input/output circuit, a coordinate determination output signal from a data output signal line is output to the electrode 18a via the data output TFT 17a. When the pen 20 is brought near the electrode 18a and the neighbor electrode 18b, electrostatic capacitances C1 and C2 are generated between the electrode 18a and the pen 20, and between the electrode 18b and the pen 20, respectively. By means of the electrostatic capacitances, the electrode 18a and the electrode 18b are electrically connected to each other. The electrode 18b applies the coordinate determination input signal to the data input signal line via the data input TFT 17b, in accordance with the coordinate determination output signal output to the electrode 18a. The coordinate determination input signal is transmitted over the data input signal line and input into a coordinate determination processing circuit (not shown). The coordinate determination processing circuit determines the coordinate of the point designated by the pen 20 based on the received signal. The pen 20 is used only for electrically connecting the electrode 18a to the electrode 18b via the electrostatic capacitances. In such a case, it is not necessary to electrically connect the pen 20 to the coordinate determination processing circuit via, for example, a signal cable, unlike in the case utilizing one electrostatic capacitance formed between one electrode 18 and the pen 20 shown in FIG. 3.

In the case where the coordinate input is performed by the above-described method, when all of or some of the components of the display circuit are used for the components of the information input/output circuit, the coordinate input operation is also performed so as not to disturb the display operation.

Next, referring to FIG. 10, a method for obtaining a coordinate determination input signal to be input to the coordinate determination processing circuit will be described. As an example, the case where the coordinate input is performed by using two electrodes 18a and 18b as shown in FIG. 8 is described. In this case, the information input/output circuit is constructed as shown in the equivalent circuit diagram of FIG. 9. Also, it is assumed that the coordinate input operation is performed in a blanking interval is between display operations, as shown in FIG. 7.

In the coordinate input operation, a pulse having a predetermined width is sequentially delayed by $t_1$ and output to the odd-numbered data output signal lines $D_1$, $D_3$, ... $D_{2n-3}$, and $D_{2n-1}$ among the signal lines 16. FIG. 10(a) shows the pulse having a width $t_0$ output to the mth signal lines 16 (m is a positive odd integer) which is one of the data output signal lines. FIG. 10(b) shows the pulse delayed by $t_1$ from the pulse shown in (a), and output to the (m+2)th data input/output signal line which is the next one of the data output signal lines. In this way, to the data output signal lines, pulses having different phases are sequentially output. The pulse width $t_0$ and the delay time $t_1$ are independently determined, and they can be set equal to each other, i.e., $t_0=t_1$.

During the above-described scanning for the data output signal lines, for example, to a data control signal line $G_M$ connected to the data output TFT 17a, a pulse is output in a synchronous manner with the pulse output to the data output signal line $D_m$. FIG. 10(c) shows the case where the width $t_2$ of the pulse applied to the data control signal line $G_M$ is equal to the pulse width $t_0$ of the signal output to the data output signal line $D_m$. FIG. 10(d) shows the case where the width of the pulse applied to the data control signal line $G_M$ is equal to the time period $t_3$ in which the scanning of the data output signal lines is performed. By the pulse application, the data output TFT 17a is made conductive for the time period $t_2$, so that the signal shown in (a) is output to the electrode 18a from the data output signal line $D_m$. At the time when the coordinate determination output signal is output to the electrode 18a, if the pen 20 is brought near and into contact with a point on the display screen in the vicinity of the electrode 18a and 18b, and the electrostatic capacitances C1 and C2 are formed, the signal to the electrode 18a is input to the electrode 18b via the electrostatic capacitance C1, the pen 20, and the electrostatic capacitance C2.

On the other hand, to the data control signal line $C_{M+1}$ connected to the data input TFT 17b, a pulse having a width $t_4$ is output over the time period $t_3$ for the scanning of the data output signal lines at a timing corresponding to the data input timing (data judging timing), as shown in (e) of FIG. 10. Herein, the data input timing is the timing at which the coordinate determination processing circuit compares the phase of the coordinate determination input signal from the data input electrode 18b with the phases of the signals output to the respective signal lines. By this pulse application, the data input TFT 17b is made conductive for the time period $t_4$. When the TFT 17b is in the conductive state, the signal input from the electrode 18a to the electrode 18b is applied to the data input signal line $D_{m+1}$ as the coordinate determination input signal. FIG. 10(g) shows the signal input to the data input signal line $D_{m+1}$ as the coordinate determination input signal. The thus obtained coordinate determination input signal is input into the coordinate determination processing circuit through the data input signal line $D_{m+1}$. The coordinate determination processing circuit determines the X-coordinate and the Y-coordinate of the point designated with the pen 20, based on the phase of the input signal.

The signal applied to the data control signal line $G_{M+1}$ is not limited to the signal having a pulse waveform as shown in (e) of FIG. 10. For example, a signal for making the data control signal line $G_{M+1}$ active for the predetermined time period $t_5$ can be alternatively applied, as shown in (f) of FIG. 10. The time period $t_5$ may be equal to the time period $t_3$ in which the scanning of data output signal lines is performed. If the signal shown in (f) of FIG. 10 is applied to the data control signal line $G_{M+1}$, a signal shown in (h) of FIG. 10 is input into the data input signal line $D_{m+1}$ as the coordinate determination input signal.

In the above description, the case where the data control signal lines are sequentially made active in the coordinate detection is explained with reference to FIG. 10. In an alternative case where all of data control signal lines are simultaneously made active, the determinations of the X-coordinate and the Y-coordinate are separately performed.

In some possible cases, a plurality of points (coordinates) are simultaneously detected depending on the condition such as the position at which the pen 20 comes in contact with the display screen. These cases can adopt, as required, a method for extracting one point from the plurality of points, such as a method for extracting coordinates of the designated point depending on, for example, the positional relationship among the detected coordinates, or the intensities of the detection signals.

In FIG. 10, the exemplary case where the TFT is made active when a signal of High level is applied. Alternatively, the TFT can be made active when a signal of Low level is applied. The waveform of the coordinate determination output signal applied to the data output signal lines $D_1$, $D_3$, ... $D_{2n-3}$, and $D_{2n-1}$ is not limited to the pulse-like shape. Alternatively, for example, if a signal having another waveform such as a sinusoid waveform is applied, the same effects can be attained as in the case where the coordinate detection output signal having a pulse-like waveform is used.

In addition, the signals applied to the data output signal lines can be signals having a specific potential level (e.g., a High level) which can be regarded as a DC potential in the data input/output period, or signals which can make a plurality of or all of the data output lines active at one time. Alternatively, the signals may be output to the data output electrodes 18a by controlling the ON/OFF state of the data output TFTs 17a at periods shorter than the data input/output periods. Also, it is not necessary to set all of the data output signal lines to which the ON signals (including the above DC signals) are output at the same potential, or to set all of the data output signal lines to which the OFF signals are output at the same potential. These can be applied to the data input signal lines.

In addition, the time period $t_3$ in which the scanning of the data output signal lines $D_1$, $D_3$, ... $D_{2n-3}$, and $D_{2n-1}$ is performed may coincide with the blanking interval $t_3$, or may be a completely different time period. In the case where a signal of a voltage level or a frequency level to which the liquid crystals do not respond is used as the coordinate determination input/output signals, the period in which the display data is output to the respective signal lines of the display circuit can be overlapped with the time period $t_3$ in which the coordinate determination output signal is output to the respective data output circuits. Moreover, the frequency level of the coordinate determination output signal can be set in the frequency range of a high-frequency signal which is inserted so as to improve the response characteristics of liquid crystals.

Figure 11:
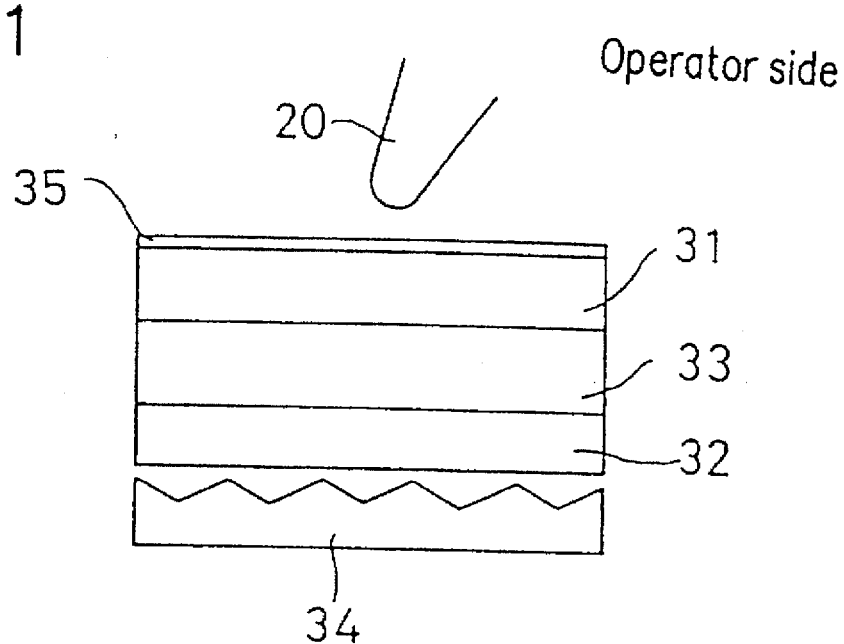
FIG. 11 is a cross-sectional view showing the construction of a liquid crystal display in another example according to the invention.

FIG. 11 is a cross-sectional view showing a liquid crystal display in another example of the invention. The liquid crystal display includes a counter substrate 31 and a substrate 32 which are disposed so as to face each other with a liquid crystal layer 33 interposed therebetween. Specifically, the counter substrate 31 is disposed on the front side, i.e., on the operator side, and the substrate 32 is disposed on the back side. On the back face of the substrate 32, a reflection plate 34 for reflecting light passing through the liquid crystal layer 33 is provided. On the face of the substrate 32 which is in contact with the liquid crystal layer 33, a display circuit including pixel electrodes disposed in a matrix, active elements, scanning signal lines, data signal lines, and the like is provided.

Figure 13:
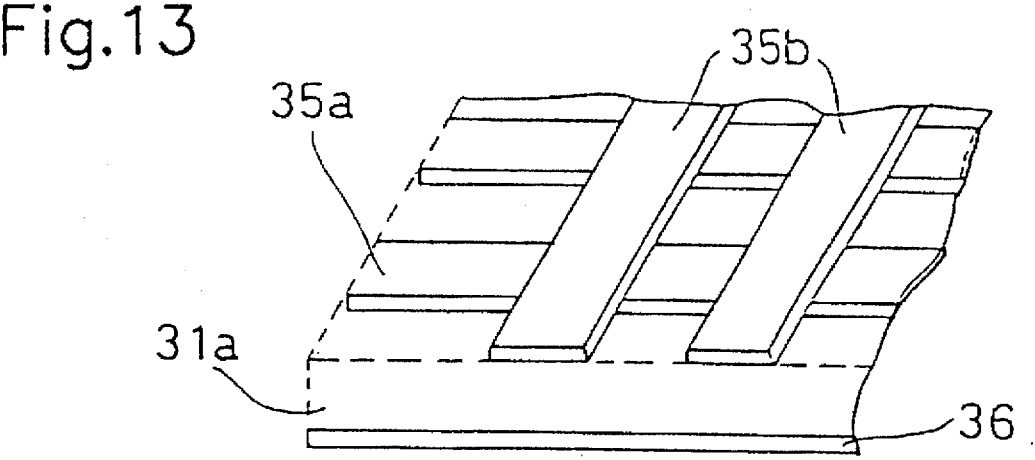
FIG. 13 is a perspective view showing another construction of the substrate on the display screen side in the liquid crystal display shown in FIG. 11.

FIG. 13 shows the construction of the counter substrate 31 provided on the front side in detail. The counter substrate 31 includes a transparent substrate 31a, a counter electrode 36 for display formed on the substrate 31a, and a layer 36 having a plurality of X signal electrodes 35a and a plurality of Y signal electrodes 35b. The production process of the counter substrate 31 is described below. First, the X signal electrodes 35a and the Y signal electrodes 35b made of a conductive material are formed on the transparent substrate 31a. In this step, at each of the crossings of the signal electrodes 35a and 35b, insulating films (not shown) for electrically insulating the X signal electrodes 35a and the Y signal electrodes 35b from each other are formed. The X signal electrodes 35a and the Y signal electrodes 35b constituted an information input/output circuit. Then, an insulating film (not shown) is formed so as to cover the entire face of the substrate 31a. The counter electrode 36 of a transparent conductive film such as ITO is formed thereon. The thus produced counter substrate 31 is attached to the substrate 32 in such a manner that the face of the substrate 31 having the counter electrode 36 formed thereon faces the substrate 32. The liquid crystal layer 33 is formed by charging liquid crystals in the gap between the substrates 31 and 32.

Figure 12:
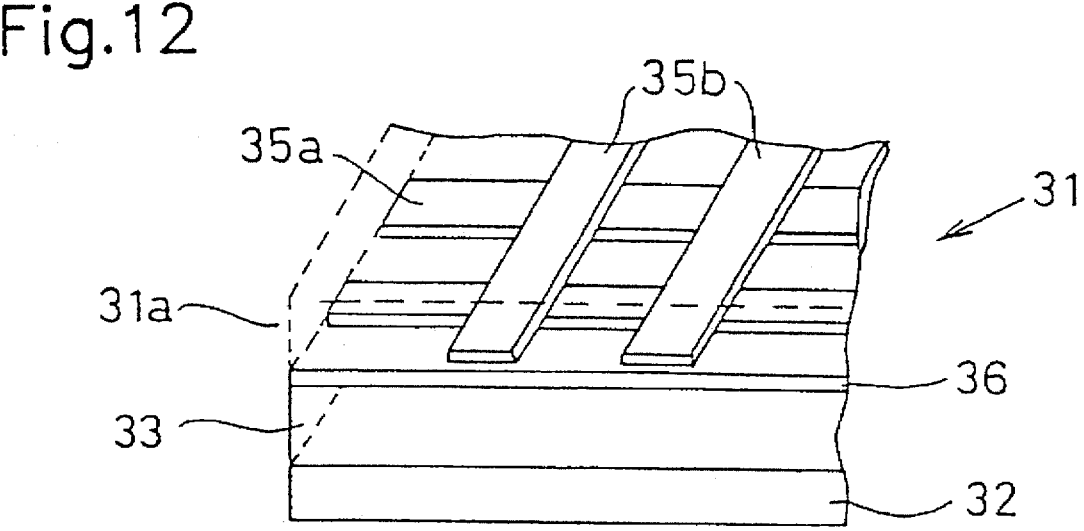
FIG. 12 is a perspective view showing the construction of the substrate on the display screen side in the liquid crystal display shown in FIG. 11.

In the liquid crystal display shown in FIG. 12, the display circuit and the information input/output circuit are separately and independently provided, so that the coordinate input operation can be performed independently of the display operations. An example of the coordinate input operation is briefly described below. First, potentials of all the X signal electrodes 35a are set to a predetermined potential, and signals having different phases are sequentially output to the Y signal electrodes 35b. When a point on the display screen is designated with a pen 20, an electrostatic capacitance is generated between the pen 20 and the Y signal electrode 35b positioned directly under the pen 20. The change of potential of the Y signal electrode 35b directly under the pen 20 is detected by the pen 20. The pen 20 is electrically connected to a coordinate determination processing circuit (not shown), and the detected potential change is input into the coordinate determination processing circuit as the coordinate determination input signal. The coordinate determination processing circuit is also connected to a driving circuit (not shown) for the Y signal electrodes 36. Thus, the coordinate determination processing circuit compares the signal output to the Y signal electrode 35b with the coordinate determination input signal input from the pen 20, so as to determine the X-coordinate of the point designated with the pen 20. The determination of the Y-coordinate is performed in substantially the same way as in the determination of the X-coordinate.

In the liquid crystal display having the above construction, the information input/output circuit is provided on the operator side as compared with the counter electrode 36 as is seen from FIG. 12, so that the coordinate determination input signal can be obtained by utilizing the electrostatic coupling without being affected by the counter electrode 36. In addition, the counter electrode 36 for display and the information input/output circuit are provided on one substrate, so that it is possible to realize a liquid crystal display with an ability of inputting coordinates and with superior productivity.

Figure 14:
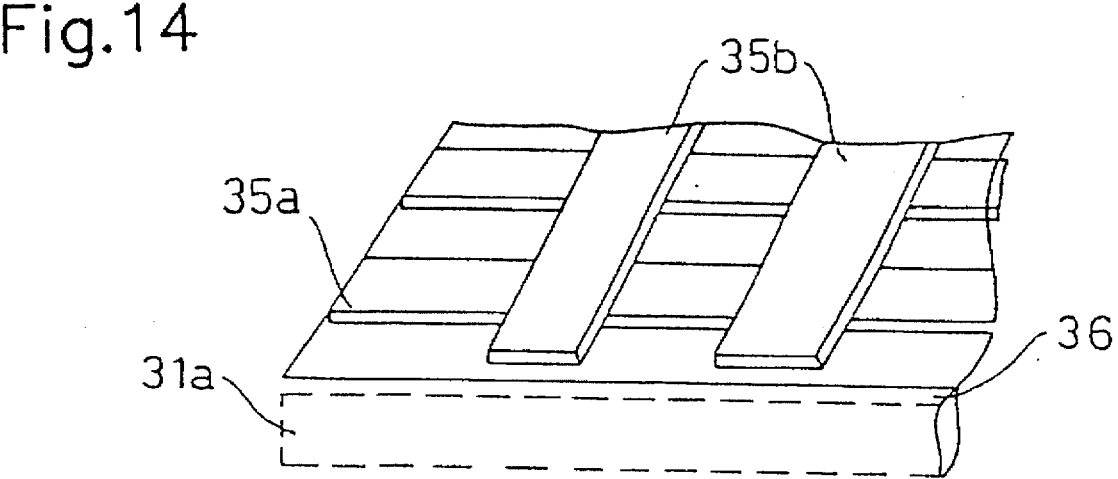
FIG. 14 is a perspective view showing another construction of the substrate on the display screen side in the liquid crystal display shown in FIG. 11.

The counter substrate 31 can be constructed as shown in FIGS. 13 and 14. In FIG. 12, the information input/output circuit and the counter electrode 36 are formed on one face of the transparent substrate 31a. In FIG. 13, the information input/output circuit and the counter electrode 36 are formed on different faces of the transparent substrate 31a. Specifically, the counter electrode 36 is formed on the face of the transparent substrate 31a which is in contact with the liquid crystal layer 33, and the X signal electrodes 35a and the Y signal electrodes 35b are formed on the face of the other side, i.e., on the operator side of the transparent substrate 31a. In the case shown in FIG. 13, it is necessary to form a transparent film for protecting the X and Y signal electrodes 35a and 35b after the formation of the signal electrodes 35a and 35b.

In FIG. 14, the counter electrode 36 and the information input/output circuit are provided on the face on the operator side of the transparent substrate 31a, not on the face in contact with the liquid crystal layer 33. In more detail, the counter electrode 36 is first formed on the transparent substrate 31a. Then the X signal electrodes 35a and the Y signal electrodes 35b are formed in such a manner the signal electrodes 35a and 35b are electrically insulated from the counter electrode 36 by means of an insulating film (not shown). As described above, each of the crossings of the X signal electrodes 35a and the Y signal electrodes 35b, an insulating film (not shown) for electrically insulating the signal electrodes from each other is formed.

Also in the liquid crystal display using the counter substrate 31 having the construction shown in FIG. 13 or 14, the coordinate input operation is performed in the same manner as in the liquid crystal display using the counter substrate 31 having the construction shown in FIG. 12. In either case, the information input/output circuit is provided separately and independently from the display circuit, so that it is unnecessary to intentionally separate the period for the display operation from the period for the coordinate input operation. Thus, the display operation and the coordinate input operation can be independently performed. As described above, it is appreciated that the display operation and the coordinate input operation may be separately performed by performing the coordinate input operation in the blanking interval.

In FIGS. 13 to 14, examples in which the information input/output circuit includes the X signal electrodes 35a and the Y signal electrodes 35b are described. Alternatively, as is shown in FIGS. 2, 5, and 6, a circuit including a plurality of signal lines crossing each other at right angles, electrodes provided in the vicinity of the crossings of the signal lines, and active elements such as TFTs for connecting the electrodes to the respective signal lines can be provided in the layer 35 of the counter substrate 31. In such cases, the coordinate input operation can be performed by either a method utilizing n electrostatic capacitance between one electrode 18 and the pen 20 shown in FIG. 3 or a method utilizing two electrostatic capacitances between each of two electrodes 18a and 18b and the pen 20 shown in FIG. 8.

In the construction shown in FIGS. 12 to 14, if the X signal electrodes 35a and the Y signal electrodes 35b are made of a transparent conductive material such as ITO, the luminance is inevitably reduced to some extent. In order to prevent the reduction of luminance, it is desired that the X signal electrodes 35a and the Y signal electrodes 35b are formed in a region provided with a light shielding film such as a black matrix for preventing light from entering the portion in which the display active elements are formed from the outside. Due to this construction, it is not necessary to use a transparent material as the material for the X signal electrodes 35a and the Y signal electrodes 35b. For example, the signal electrodes 35a and 35b can be formed of Al or the like. In the case where a circuit including active elements and electrodes is used as the information input/output circuit, it is desired that the components such as the active elements and electrodes are formed in a region provided with a light shielding film. Similarly, in the case where the information input/output circuit such as shown in FIGS. 2, 5, and 6 is provided, it is desired that the components of the information input/output circuit are formed in a region provided with a light shielding film. Alternatively, the information input/output circuit may also function as a light shielding film by forming the respective components of the information input/output circuit using a material having a light shielding property.

The construction shown in FIGS. 12 to 14 can be applied not only to a reflection-type liquid crystal display but also to a transmission-type liquid crystal display.

Figure 19:
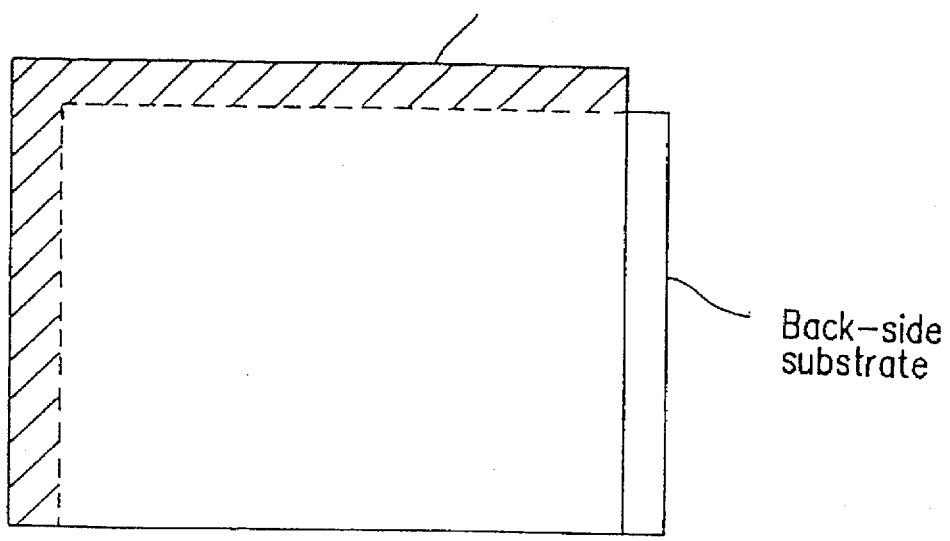
FIG. 19 is a front view for illustrating the case where the substrate size should be increased.

In some possible cases, for example, there may be a method by which a counter electrode on a counter substrate is divided into a plurality of portions in one dimension and the divided portions are utilized for the coordinate detection. In such cases, the divided electrode strips are short-circuited during the display period. However, if the counter electrode is divided into a plurality of strips, it is necessary to electrically connect each electrode strip to the external. Therefore, by forming a number of contacts (equal to or larger than the number of divided portions of the signal line or electrode in the row direction) for connecting the substrate 32 on which the active elements and pixel electrodes of the display circuit are formed to the counter substrate 31, the respective signal lines or electrodes should be connected to the external via the substrate 32. Alternatively, direct connection to the external should be realized by extending the respective divided portions of the signal lines or electrodes from the counter substrate 31. However, in the former case, the contact should have a diameter of about 1 mm in view of the impedance and the like, so that there exists a problem in that such a connection can be realized only in a screen display having a size across the corners of at least 10-15 inches. In the latter case, as is indicated by hatching in FIG. 19, it is necessary to provide a connection area for the counter substrate 31 which is disposed on the front side (on the operator side). This causes the number of process steps to be increased. Moreover, the substrate size is increased, so that the miniaturization of the device is prevented.

Considering the case where a-Si TFTs are conventionally as the active elements of the information input/output circuit. Since it is known that the a-Si TFTs are easily affected by light, some light shielding means should be provided over the a-Si TFTs. This causes the construction of the substrate to be complicated. In addition, by the influence of the light shielding means, any adverse phenomenon such that the detection sensitivity of the pen may be deteriorated or that the light utilization efficiency of the liquid crystal display is deteriorated can occur.

On the other hand, according to the invention, instead of the method by which the counter electrode is divided into a plurality of strips for the coordinate detection, electrodes for coordinate detection are provided independently of the counter electrode, as shown in FIGS. 12, 13, and 14. Thus, there may not arise a problem of the increase of the substrate size. Also according to the invention, it is not necessary to separate the display period from the coordinate detection period. Moreover according to the invention, even if there is a necessity for setting longer the period in which the coordinate determination input signal is picked up because the impedance of each signal line is increased due to the increase of device size, the respective signal lines are not influenced by the longer pick-up period. If active elements are included as the components of the information input/output circuit, it is possible to provide, for example, coordinate detection signal generating means on the counter substrate, by using elements having a mobility of 5 $cm^2/V.s$ or more such as p-Si TFTs as the active elements. With such construction, it is not necessary to connect each of the coordinate detection electrodes to the external of the substrate, and hence it become possible to significantly reduce the number of interfaces to the external of the substrate. As such coordinate detection signal generating means, a circuit having a known construction such as a circuit using a shift register, and a circuit using a decoder is used. If elements which are less affected by light are used as the active elements, it is possible to avoid the occurrence of problems such as complication of substrate structure, reduction of coordinate detection accuracy, or the reduction of light utilization efficiency of the liquid crystal display.

Next, referring to FIGS. 15 and 16, another example of the invention will be described below.

Figure 15:
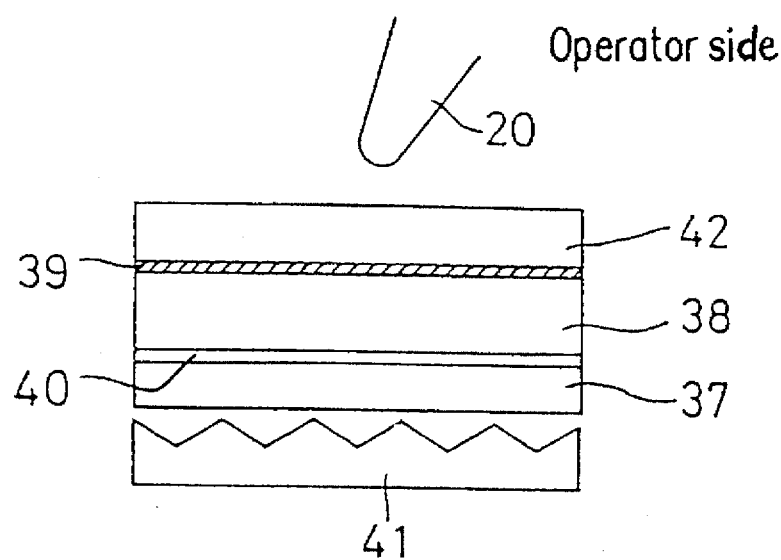
FIG. 15 is a cross-sectional view showing a liquid crystal display in another example according to the invention.

FIG. 15 is a cross-sectional view showing a liquid crystal display in another example according to the invention. The liquid crystal display includes a substrate 37, a counter substrate 42, and a liquid crystal layer 38 interposed between the substrates 37 and 42. The counter substrate 42 is disposed on the front side (on the operator side). As the substrate 37 and the counter substrate 42, transparent substrates are used. On the face of the substrate 37 which is in contact with the liquid crystal layer 38, a layer 40 including a display circuit and an information input/output circuit is formed. On the other face of the substrate 37 which is not in contact with the liquid crystal layer 38, a reflection plate 41 for reflecting light which is incident on the substrate 37 through the liquid crystal layer 38 is provided. On the face of the counter substrate 42 which is in contact with the liquid crystal layer 38, a counter electrode 39 for display is provided. As is shown in FIG. 16, in the counter electrode 39, apertures 39a are formed. The display circuit and the information input/output circuit formed in the layer 40 on the substrate 37 may have any one of the constructions shown in FIGS. 2, 5, and 6.

Figure 16:
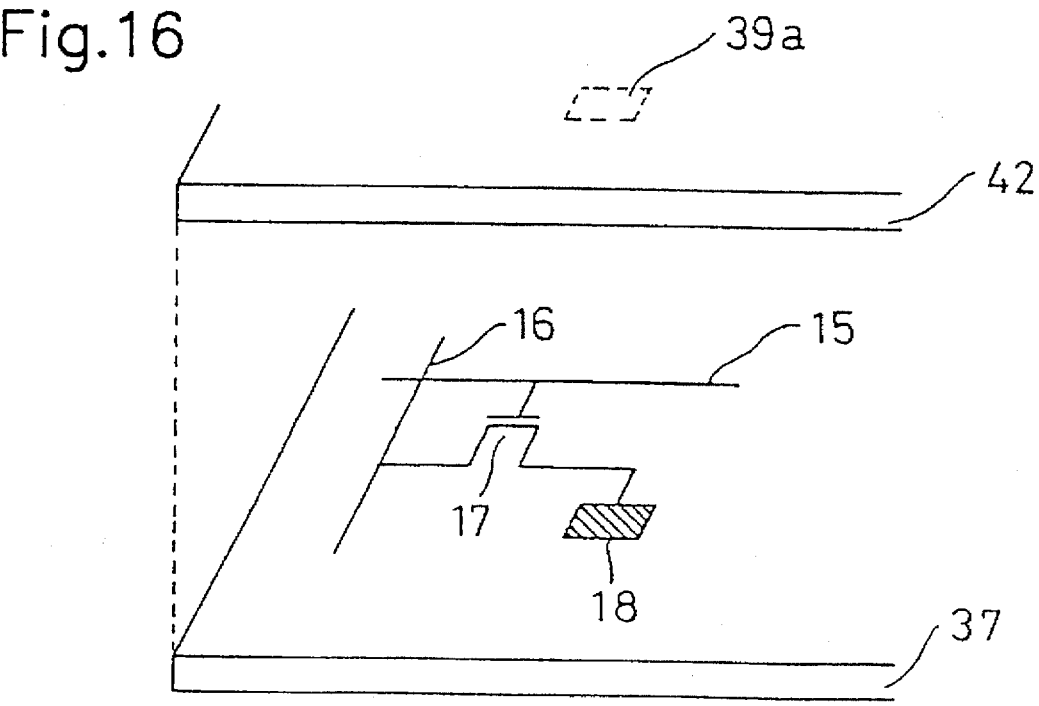
FIG. 16 is a perspective view showing the liquid crystal display in FIG. 15 in more detail.
Figure 17:
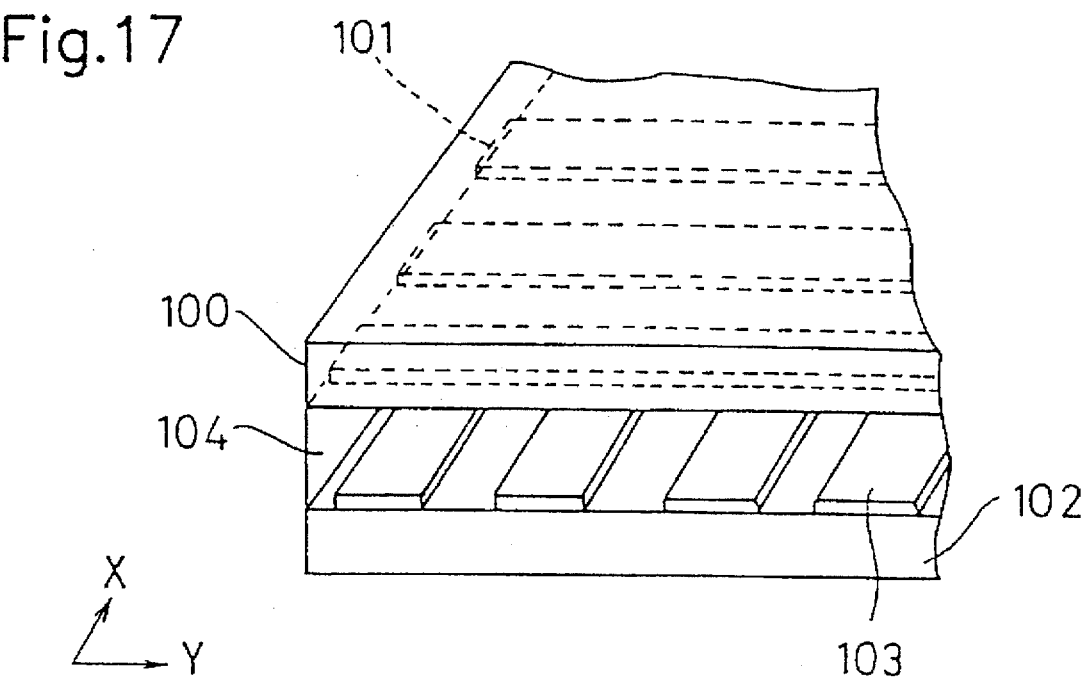
FIG. 17 is a perspective view showing a conventional simple matrix type liquid crystal display.
Figure 18:
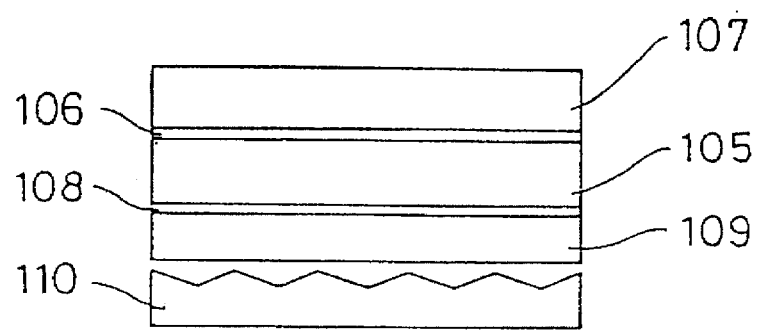
FIG. 18 is a cross-sectional view showing an exemplary conventional liquid crystal display having an information input/output circuit.

FIG. 16 shows a relative positional relationship between the information input/output circuit and the aperture 39a in the counter electrode 39. FIG. 16 shows, as an example, the case where the circuit shown in FIG. 3 in which the electrostatic capacitance between one electrode 18 and the pen 20 is utilized for coordinate input is used. In addition, it is assumed that one information input/output circuit is provided for each pixel. The aperture 39a is provided at a position of the counter electrode 39 corresponding to the position of the electrode 18. Accordingly, if the counter substrate 42 is disposed on the operator side, an electrostatic capacitance is formed between the pen 20 and the electrode 18 via the aperture 39a, so that the pen 20 can receive the signal output to the electrode 18. In this way, even in a liquid crystal display in which the counter substrate is disposed on the operator side, the coordinate input can be performed by the method shown in FIG. 3.

The size of the aperture 39a is not necessarily equal to the size of the electrode 18 of the information input/output circuit. If the pixel electrodes of the display circuits function as the electrodes 18 of the information input/output circuit as is shown in FIG. 5, it is necessary to divide a portion of the counter electrode 39 corresponding to each pixel electrode into a portion functioning as an electrode and a portion of the aperture 39a. In FIG. 16, the constructions of the display circuit and the information input/output circuit included in the layer 40 on the substrate 37 are the same as those shown in FIG. 2. Alternatively, it is appreciated that the constructions may be those shown in FIGS. 5 and 6.

In FIG. 16, the coordinate input is performed by utilizing the electrostatic coupling between one electrode 18 and the pen 20 as is shown in FIG. 3. If the coordinate input is performed by using two electrostatic capacitances between each of the electrodes 18a and 18b and the pen 20 as is shown in FIG. 8, the same effects as in the case of FIG. 3 can be attained by providing apertures 39a at portions of the counter electrode 39 corresponding to the data output electrode 18a and the data input electrode 18b, respectively.

The information input/output circuit described above includes electrodes and active elements for data input/output. However, the electrodes and active elements are not necessarily provided, and the data may be input/output through one or more systems of signal lines. If two or more systems of signal lines are used, the provision of data signal lines is not limited to one of the substrates, and the data signal lines may be divisionally provided on the facing two substrates. In a specific case where data input/output signal lines are provided on the side opposite to the operator side (the display screen side) of the liquid crystal display, it is necessary to provide some structure corresponding to apertures in the substrate on the operator side. In the above example, the circuitry of the pixel portion is not limited to those shown in the figures. For example, each of the transistors connected to the display pixel electrode and the transistor for data input/output is not necessarily a p-channel or n-channel transistor, but may be transistor of CMOS type. Moreover, other additional elements (circuits) can be provided as required without causing any problems.

Naturally, the present invention can be alternatively constructed in such a manner that, for example, the data input signal lines, the data input electrodes, and the like used in the above description can be included in the data input/output signal lines, the data input/output electrodes, and the like each of which are set in the input stata. Alternatively, such a construction may be applied to the output side.

In the above description, a method for inputting information such as coordinates by means of an information transmitting medium such as a pen is described. However, the information transmitting medium applicable to the invention is not limited to the described types. For example, in order to merely input the coordinates, a finger can be used.

As described above, according to the invention, an input operation can be performed with a pen or the like, utilizing the electrostatic coupling, whereby a liquid crystal display with bright display and with low power consumption can be provided. In the case where the active elements of the information input/output circuit provided on the substrate disposed on the display front side have the carrier mobility of 5 cm$^2$/V.s, the size of the information input/output circuit can be decreased. Therefore, if the information input/output circuit is provided on the substrate disposed on the front side, the circuit may not disturb the display.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display apparatus comprising:
   a first substrate and a second substrate which are disposed to face each other;
   a display medium sandwiched between the first substrate and said second substrate, said display medium having variable optical characteristics;
   a display circuit provided on said first substrate;
   a reflection counter electrode provided on said second substrate for reflecting light which has passed through said display medium, said reflection counter electrode being formed between said second substrate and said display medium and
   a coordinate input means for inputting coordinates of a point on said first substrate; and
   wherein said coordinate input means includes:
   a plurality of coordinate input electrodes arranged in a matrix on said first substrate;
   first signal lines for supplying the coordinate determination signals to said coordinate input electrodes, respectively, said first signal lines being formed on said first substrate;
   first active elements for electrically connecting said plurality of coordinate input electrodes to said first signal lines, respectively;
   a coordinate designating member for, when said coordinate designating member is brought near said first substrate, forming an electrostatic capacitance with at least one of said plurality of coordinate input electrodes; and
   a coordinate determination means for receiving said coordinate determination signal from said at least one of said plurality of coordinate input electrodes, and for determining the coordinates of a point to which said coordinate designating member is closest, based on said received coordinate determination signal.

2. A display apparatus according to claim 1, wherein said display circuit includes: pixel electrodes; second signal lines for applying driving signals to said pixel electrodes, said driving signals causing said optical characteristics of said display medium to be varied; and second active elements for electrically connecting said second signal lines to said pixel electrodes in accordance with a control signal.

3. A display apparatus according to claim 2, wherein each of said first active elements and said second active elements has a carrier mobility of 5 cm$^2$/V s or more.

4. A display apparatus according to claim 3, wherein said coordinate input means further includes third signal lines provided on said first substrate, said third signal lines crossing said first signal lines at right angles, said third signal lines transmitting signals for controlling ON/OFF states of said first active elements, wherein said first active elements are thin film transistors.

5. A display apparatus according to claim 4, wherein said display circuit further includes: fourth signal lines provided on said first substrate, said fourth signal lines crossing said second signal lines at right angles, said fourth signal lines transmitting said control signals;

wherein said second active elements are thin film transistors connected to said second signal lines and said fourth signal lines, and the optical characteristics of said display medium are varied depending on a potential difference between said counter electrode and said pixel electrodes.

6. A display apparatus according to claim 5, wherein said first and second active elements are p-Si TFTs.

7. A display apparatus according to claim 1, wherein the phase of said coordinate determination signal is different from the phase of the remaining coordinate determination signals.

8. A display apparatus according to claim 1, wherein said display circuit comprises a plurality of pixels, and wherein each of said pixels is associated with at least two of said coordinate input electrodes.

* * * * *